United States Patent
McRae

(10) Patent No.: US 9,338,852 B2
(45) Date of Patent: May 10, 2016

(54) FIPEL PANEL LIGHT BULB WITH TUNABLE COLOR

(71) Applicant: Vizio Inc, Irvine, CA (US)

(72) Inventor: Matthew McRae, Irvine, CA (US)

(73) Assignee: Vizio, Inc, Irvine, CA (US)

( * ) Notice: Subject to any disclaimer, the term of this patent is extended or adjusted under 35 U.S.C. 154(b) by 217 days.

(21) Appl. No.: 13/927,309

(22) Filed: Jun. 26, 2013

(65) Prior Publication Data

US 2015/0002030 A1 Jan. 1, 2015

(51) Int. Cl.
*H05B 33/08* (2006.01)
*H05B 37/02* (2006.01)

(52) U.S. Cl.
CPC ........ *H05B 33/0872* (2013.01); *H05B 37/0218* (2013.01); *H05B 33/0854* (2013.01)

(58) Field of Classification Search
CPC ........... H05B 33/0854; H05B 37/0218; H05B 33/0842; H05B 33/0848; H05B 33/0872; H05B 33/08
USPC .......................... 315/149–159, 291, 307–326, 315/169.1–169.4
See application file for complete search history.

(56) References Cited

U.S. PATENT DOCUMENTS

| | | | | |
|---|---|---|---|---|
| 7,193,363 | B2* | 3/2007 | Kawashima | 313/509 |
| 7,521,872 | B2* | 4/2009 | Bruning | 315/158 |
| 2011/0279015 | A1* | 11/2011 | Negley et al. | 313/501 |
| 2012/0033429 | A1* | 2/2012 | Van De Ven | 362/294 |
| 2012/0068600 | A1* | 3/2012 | Hartmann et al. | 315/51 |
| 2013/0082596 | A1* | 4/2013 | Lucz et al. | 315/51 |
| 2013/0313978 | A1* | 11/2013 | Fields et al. | 315/155 |
| 2015/0061502 | A1* | 3/2015 | Rains et al. | 315/149 |

OTHER PUBLICATIONS

Effect of multi-walled carbon nanotubes on electron injection and charge generation in AC field-induced polymer electroluminescence Yonghua Chen, Gregory M. Smith, Eamon Loughman, Yuan Li, Wanyi Ni, David L. Carroll, Organic Electronics 14 (2013) 8-18.

* cited by examiner

*Primary Examiner* — Tuyet Vo
(74) *Attorney, Agent, or Firm* — Law Office of Scott C Harris, Inc

(57) ABSTRACT

A lighting device for use in creating light, e.g., for replacing a light bulb. The device is in a bulb shaped housing, having an element emitting light. That element can be a FIPEL element. The device has a signal generator, outputting a signal having a frequency. The element has a light emitting layer that receives the signal from the signal generator, and outputs light of a wavelength that is dependent on said frequency emitted by said signal generator. A sensor senses ambient light adjacent said housing, and adjusts said signal generator based on said ambient light that is sensed. This maintains a constant ambient light level and color temperature as observed by a user as the actual ambient light levels vary over time.

29 Claims, 14 Drawing Sheets

FIPEL PANEL LIGHT BULB WITH TUNABLE COLOR

BACKGROUND

Conventional incandescent light bulbs have been in use since General Electric refined the filaments in 1913. These light bulbs grew to be in common use around the world until the introduction of compact fluorescent (CF) bulbs which produced the same quantities of light output while shedding substantially less heat as a product of light production. Light Emitting Diodes (LED) are now being used for light bulbs. LED light bulbs are more efficient than fluorescent tube lights and compact fluorescent light bulbs.

Compact fluorescent light bulbs have now replaced incandescent light bulbs to the extent that some states have banned the production of incandescent light bulbs. CF bulbs have dropped in price to almost the same level as incandescent light bulbs. LED light bulbs, while more efficient than CF bulbs are considerably more expensive.

SUMMARY OF THE INVENTION

The inventors recognize that what is needed is a light bulb that is less expensive and more efficient than LED light bulbs and competitive with CF light bulbs.

The present invention describes an assembly that uses an electroluminescent panel for generation of light. The particular type of electroluminescent technology used by the invention is Induced Polymer ElectroLumuinescence, referred to as FIPEL lighting. FIPEL panels can emit light from one or both sides of the panel and can be stacked such that the panels are in physical contact with each other. FIPEL technology can also make use of flexible and moldable components so that light bulbs using the technology can be made to resemble incandescent light bulbs or fluorescent tube lights.

DETAILED DESCRIPTION

A preferred embodiment of the present invention is a replacement light bulb with either a single FIPEL panel or two FIPEL panels in a stacked configuration. Stacked FIPEL panels can be constructed to emit all of the generated light from both panels in a single direction from one surface of the stack or from both surfaces of the stack.

Another embodiment utilizes substrates that are flexible and/or moldable such that the outer shell of the light bulb is either a single FIPEL panel or two FIPEL panels in a stacked configuration.

Embodiments of a FIPEL light bulb in either single or stacked FIPEL panels or configurations where the FIPEL panel is the outer shell of the light bulb may have an ambient light sensor and/or an EMF sensor. The ambient light sensor provides an input to the control module such that the control module manages the color temperature of the emitted light. The EMF sensor serves as a receiver for control signals initiated by a user to further control the color temperature of the emitted light. The EMF sensor may serve to receive RF signals such as those used for WiFi signals or it may receive IR signals such as those initiated by a hand held remote control device.

Another embodiment enables the replacement of a fluorescent light tube by a FIPEL light tube. In a first embodiment of this type of configuration, the FIPEL light tube mimics a fluorescent light tube where light is emitted equally all around the outer surface of the FIPEL light tube. In a second embodiment of this type of configuration, the FIPEL light tube is split alone its horizontal axis such that there is an upper portion and a lower portion. In this embodiment, the upper portion reflects all light emitted down into the interior of the FIPEL light tube and through the lower portion of the FIPEL light tube. The lower portion of the FIPEL light tube emits light upward into the interior of the FIPEL light tube where it is reflected back downward such that all of the emitted light exits through the lower portion. This directs all of the light downward and is more efficient than normal fluorescent light tubes.

Figure 1:
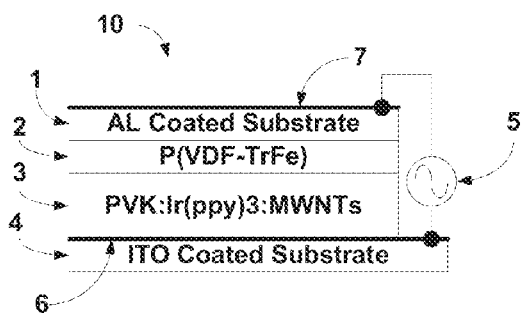
FIG. 1 is a depiction of an asymmetrical (single dielectric layer) FIPEL device that emits light from one surface.
Figure 2:
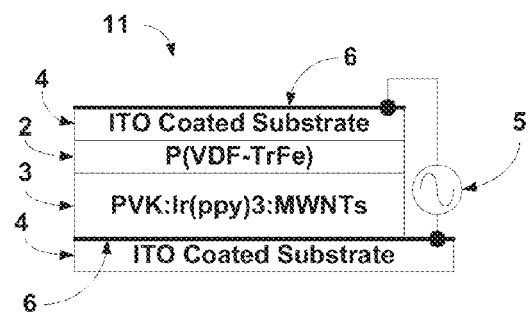
FIG. 2 is a depiction of an asymmetrical (single dielectric layer) FIPEL device that emits light from two surfaces.

To appreciate the simplicity of FIPEL devices, reference FIGS. 1 and 2.

FIGS. 1 and 2 illustrate single dielectric FIPEL devices. The basic constructions of these FIPEL devices are discussed in the following.

Lab quality FIPEL devices are generally fabricated on glass or suitable plastic substrates with various coatings such as aluminum and Indium tin oxide (ITO). ITO is a widely used transparent conducting oxide because of its two chief properties, it is electrical conductive and optical transparent, as well as the ease with which it can be deposited as a thin film onto substrates. Because of this, ITO is used for conducting traces on the substrates of most LCD display screens. As with all transparent conducting films, a compromise must be between conductivity and transparency, since increasing the conduction properties (thickness) increases the concentration of charge carriers which in turn increases the material's conductivity, but decreases its transparency. ITO coatings used for the lab devices discussed here is approximately 100 nm in thickness. In FIG. 1, emissive side substrate 4 is coated with ITO coating 6 residing against PVK layer 3. In FIG. 2, ITO coating 6 is on both substrates as shown.

Figure 3:
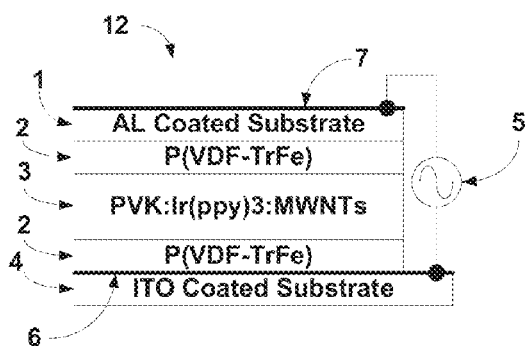
FIG. 3 is a depiction of a symmetrical (two dielectric layers) FIPEL device that emits light from one surface.

Substrate 1 in FIGS. 1 and 3 is coated with an aluminum (AL) coating 7. The resulting thickness of the Al deposition is sufficient to be optically opaque and reflective. This ensures that any light from emissive layer 3 that travels toward substrate 1 is reflected back through emissive substrate 4 with ITO coating 6 for devices illustrated in FIG. 1. If it is desired that light be emitted through both substrates, a substrate 4 with an ITO coating 6 will be substituted for substrate 1 with AL coating 7 as shown in FIG. 2.

The differences between the 2 similar substrates is how ITO coating 6 is positioned. In FIG. 1, emissive ITO coating 6 is positioned such that ITO coating 6 on substrate 4 is physically in contact with PVK layer 3. In FIG. 2, substrate 1 with Al coating 7 (FIG. 1) is replaced with substrate 4 with ITO coating 6 not in physical contact with the P(VDF-TrFe) (dielectric layer) layer 2. This allows light to be emitted from both the top and bottom surfaces of the FIPEL device.

Dielectric layer 2 in all cases is composed of a copolymer of P(VDF-TrFE) (51/49%). The dielectric layer is generally spin coated against the non-AL coated 7 side of substrate 1 or non-ITO coated 6 of substrate 4 of the top layer (insulated side). In all cases the dielectric layer is approximately 1,200 nm thick.

Emissive layer 3 is composed of a mix polymer base of poly (N-vinylcarbazole):fac-tris(2-phenylpyri-dine)iridium (III) [PVK:Ir(ppy)3] with Multi Walled Nano Tubes (MWNT). The emissive layer coating is laid onto the dielectric layer to a depth of approximately 200 nm. For the lab devices with the greatest light output the concentration of MWNTs to the polymer mix is approximately 0.04% by weight.

When an alternating current is applied across the devices shown in FIGS. 1 and 2 (asymmetrical devices containing 1 dielectric layer) the emissive layer emits light at specific wavelengths depending on the frequency of the alternating current. The alternating current is applied across the conductive side of the top substrate 1 (Al coating 7) or substrate 4 and the conductive side (ITO coating 6) of bottom substrate 4. Light emission comes from the injection of electrons and holes into the emissive layer. Holes follow the PVK paths in the mixed emissive polymer and electrons follow the MWNTs paths.

Carriers within the emissive layer then recombine to form excitons, which are a bound state of an electron and hole that are attracted to each other by the electrostatic force or field in the PVK host polymer, and are subsequently transferred to the Ir(ppy)3 guest, leading to the light emission.

Figure 4:
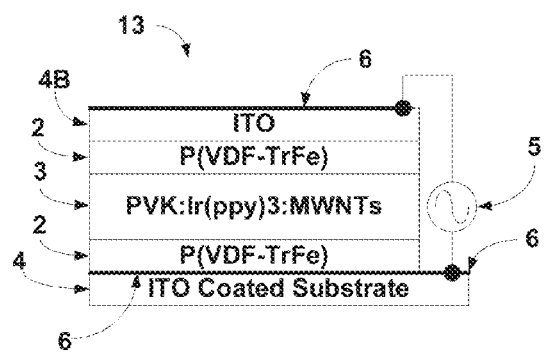
FIG. 4 is a depiction of a symmetrical (two dielectric layers) FIPEL device that emits light from two surfaces.

Now referencing FIGS. 3 and 4. The FIPEL panels shown in these two figures are similar to those shown in FIGS. 1 and 2 with the exception that dielectric layer 2 is present on both sides of emissive layer 3. While FIPEL panels constructed as shown in FIGS. 3 and 4 emit light, the amount of light emitted is not as great as devices shown in FIGS. 1 and 2.

The frequency of the alternating current applied across the substrates of a FIPEL panel determines the color of light emitted by the panel. Any index on the CIE color chart can be duplicated by selecting the frequency of the alternating current. Signal generator 5 may be of a fixed frequency which is set by electronic components (not shown) or signal generator 5 may be controlled by a microprocessor (not shown) executing algorithms that determine the frequency of signal generator 5 based on stimuli received by the microprocessor.

Aluminum coating 7 may also be any reflective and conductive coating such as but not limited to graphene, tin, nickel or other conductive and reflective coatings.

Figure 12:
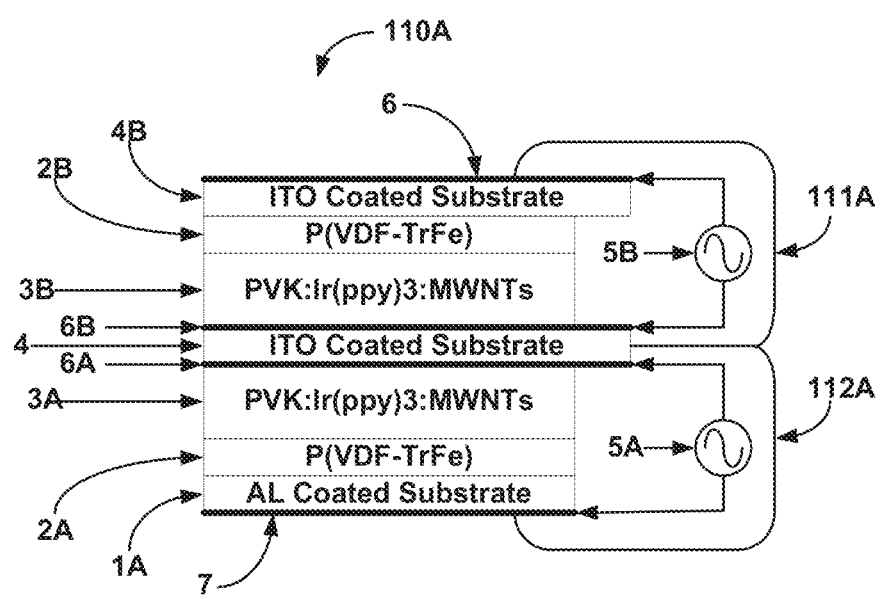
FIG. 12 is a schematic diagram of a stacked FIPEL panel that emits light in a single direction only.

Now referencing FIG. 12 where 110A depicts a stacked FIPEL panel consisting of two individual FIPEL panels 111A and 112A, with one ITO coated substrate 4 in common. In this depiction, light is emitted only from one side of the combined stacked FIPEL panels.

In this depiction lower FIPEL panel 112A is composed of field substrate 1A with aluminum coating 7 followed by dielectric layer 2A then emissive layer 3A followed by emissive substrate 4 with ITO coating 6A.

Light emitted by emissive layer 3A travels downward and upward at the same time. Light emitted downward is reflected back upward by aluminum coating 7. Light emitted upward from emissive layer 3A or reflected upward by aluminum coating 7 travels through upper FIPEL panel 111A exiting the panel through field substrate 4B with ITO coating 6.

In this depiction, upper FIPEL panel 111A is composed of field substrate 4B with ITO coating 6 followed downward by dielectric layer 2B followed downward by emissive layer 3B followed downward by emissive substrate 4 with ITO coating 6B.

Light emitted by emissive layer 3B travels downward and upward at the same time. Light emitted downward travels through bottom FIPEL panel 112A and is reflected back upward by aluminum coating 7. Light emitted upward from emissive layer 3B or reflected upward by aluminum coating 7 travels through the upper FIPEL panel exiting the panel through field substrate 4B with ITO coating 6.

In this depiction, signal generator 5A provides alternating current to lower FIPEL panel 112 and signal generator 5B provides alternating current to upper FIPEL panel 111A. The color of light emitted by either panel is determined by the frequency of the alternating current provided by signal generators 5A and 5B.

The actual frequency of the alternating current provided by signal generators 5A and 5B is determined by either preset fixed values of components in the signal generators or algorithmically by a microprocessor(s) based on some stimulus to the microprocessor(s).

This configuration of two FIPEL panels in physical contact will result in substantially more light output than a single FIPEL panel. An interesting point to note is that a single FIPEL panel using glass substrate in lab quality panels is approximately 0.041 thousandths thick and a stacked FIPEL panel as shown in FIG. 12 would be approximately 0.082 thousandths thick. FIPEL panels may be stacked in stacks greater than two.

Figure 13:
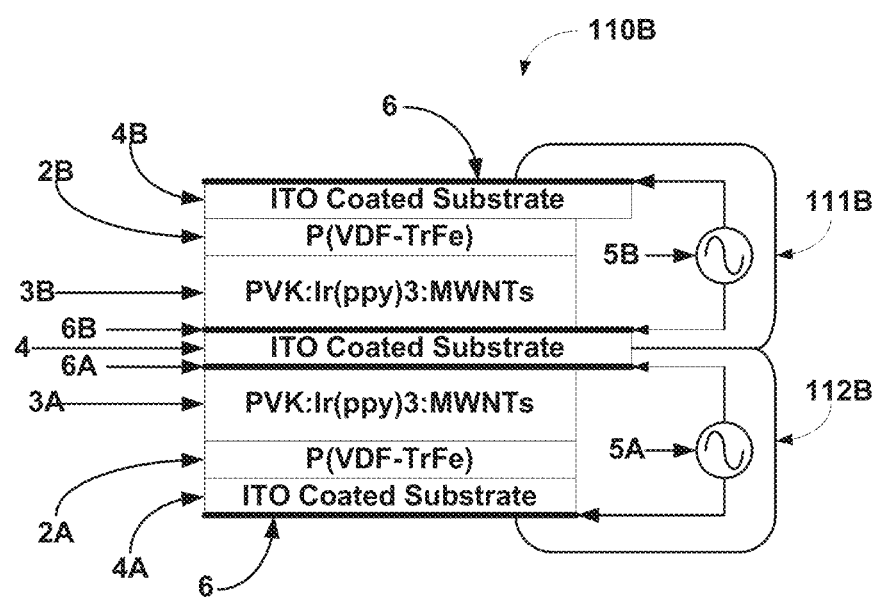
FIG. 13 is a schematic diagram of a stacked FIPEL panel that emits light in two directions.

Now referencing FIG. 13 where stacked FIPEL panel 110B is depicted. FIPEL panel 110B is identical to FIPEL panel 110A with the exception of the bottom panel 112B. Note that the difference between the stacked FIPEL panel as shown in FIG. 12 and the stacked FIPEL panel as shown in FIG. 13 is in the substrate coat on substrate 4A which is the bottom substrate of the stack. The stacked FIPEL panel depicted in FIG. 13 has a transparent coating of ITO shown as 6 in FIG. 13 and the stacked FIPEL panel depicted in FIG. 12 has a reflective coating of aluminum shown as 7 in FIG. 12. Stacked FIPEL panel 110B in FIG. 13 emits light equally from both surfaces.

Figure 6:
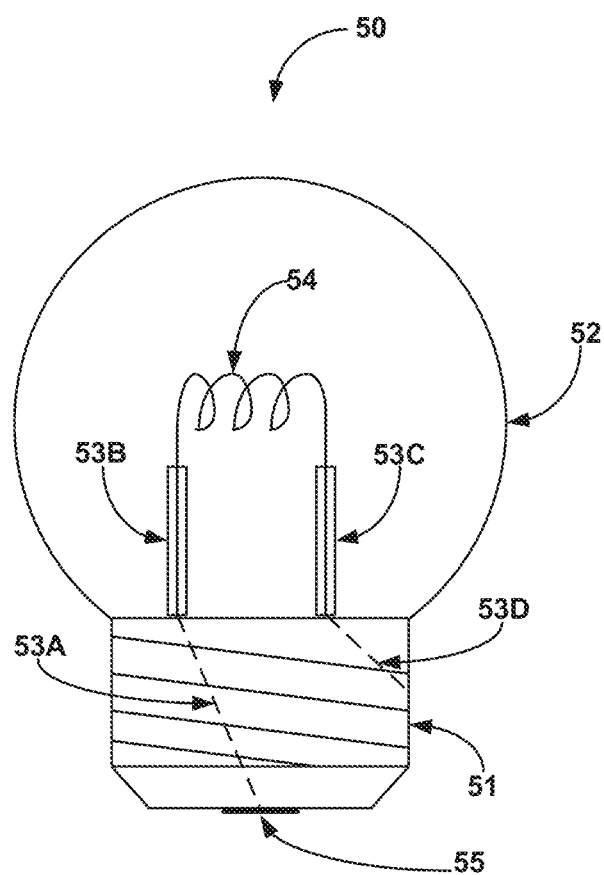
FIG. 6 is a .prior art schematic of a typical incandescent light bulb.

Now referencing prior art FIG. 6 where 50 depicts a typical incandescent light bulb. In this depiction the basic components of incandescent light bulb 50 are transparent shell 52, filament 54, filament supports 53B and 53C, base 51, conductors 53A and 53D and center conductor 55. In this depiction alternating or direct current enters bulb 50 through base 51 and is carried to filament 54 through conductor 53D. Current passing through filament 54 heats filament 54 to an incandescent temperature where filament 54 gives off light and heat. Current return path from filament 54 is though conductor 53A to center conductor 55.

Incandescent light bulbs such as that depicted have been shipping to market since at least 1911. Despite manufacturing improvements for producing incandescent light bulbs the bulbs have remained inefficient and in some countries production has halted due to laws banning their production.

Figure 7:
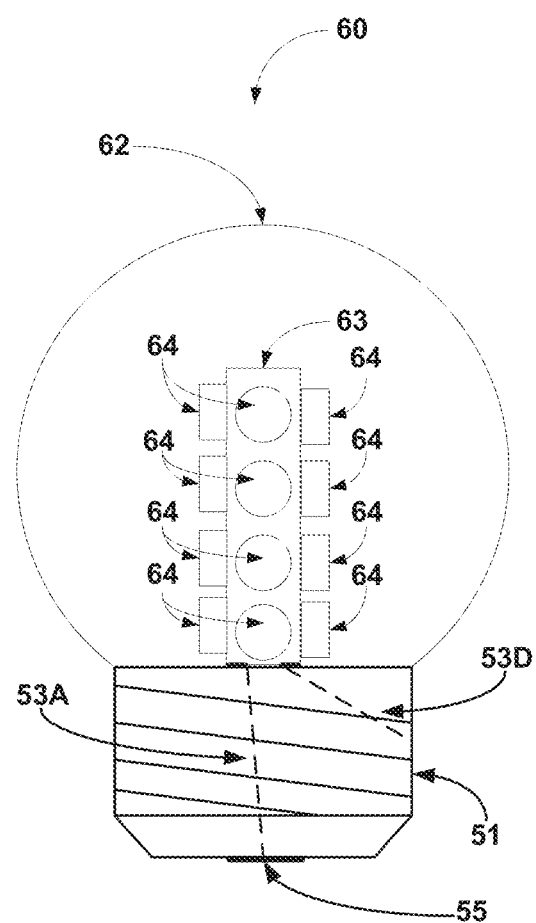
FIG. 7 is a prior art schematic of a typical LED light bulb.

Now referencing prior art FIG. 7 where 60 depicts a more modern high efficiency Light Emitting Diode (LED) light bulb. In the depiction some basic components mirror those found in incandescent light bulbs. The LED light bulb depicted as 60 contains transparent shell 60, base 51, conductors 53A and 53D and center conductor 55. In this depiction alternating current enters bulb 50 through base 51 and is carried to electronics module 63 through conductor 53D. Current entering electronics module 63 is converted to direct current which is distributed to LEDs 64 where light is emitted from the LEDs. Current return path from control module 63 is though conductor 53A to center conductor 55. This type of light bulb provides light quantities on the same order as incandescent light bulbs while consuming far less power. LED light bulbs while not emitting as much heat as incandescent light bulbs still emit heat.

Figure 8A:
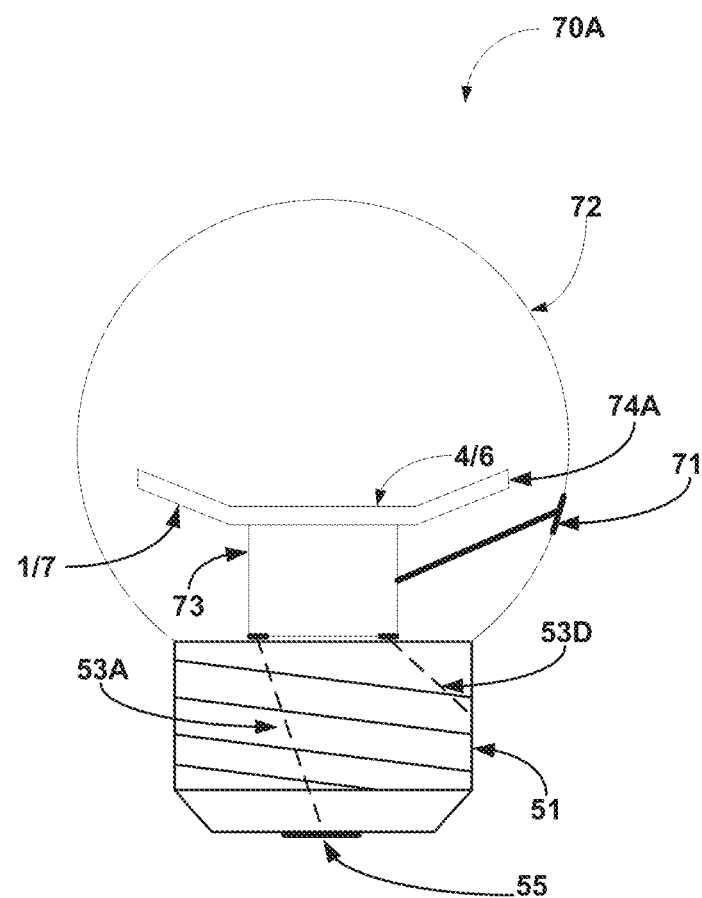
FIG. 8A is a depiction of a FIPEL light bulb with a single layer FIPEL panel and a sensor to sense ambient light.

Now referencing FIG. 8A where 70A depicts several embodiments of a FIPEL light bulb. In this depiction some basic components mirror those found in incandescent light bulbs. The FIPEL light bulb depicted as 70A contains transparent shell 72, base 51, conductors 53A and 53D and center conductor 55. In this depiction alternating current enters bulb 50 through base 51 and is carried to electronics module 73 through conductor 53D. Current entering electronics module 73 is converted to direct current which powers signal generator 5 (FIGS. 1-4) which supplies alternating current to FIPEL panel depicted as 74A. This FIPEL panel is also shown in FIG. 1 and described in the detailed description for FIG. 1. Current return path from electronics module 73 is though conductor 53A to center conductor 55. This type of light bulb provides light while consuming far less power that either incandescent light bulbs, CF light devices or LED light bulbs and emits lower levels of heat than LED light bulbs.

Figure 5:
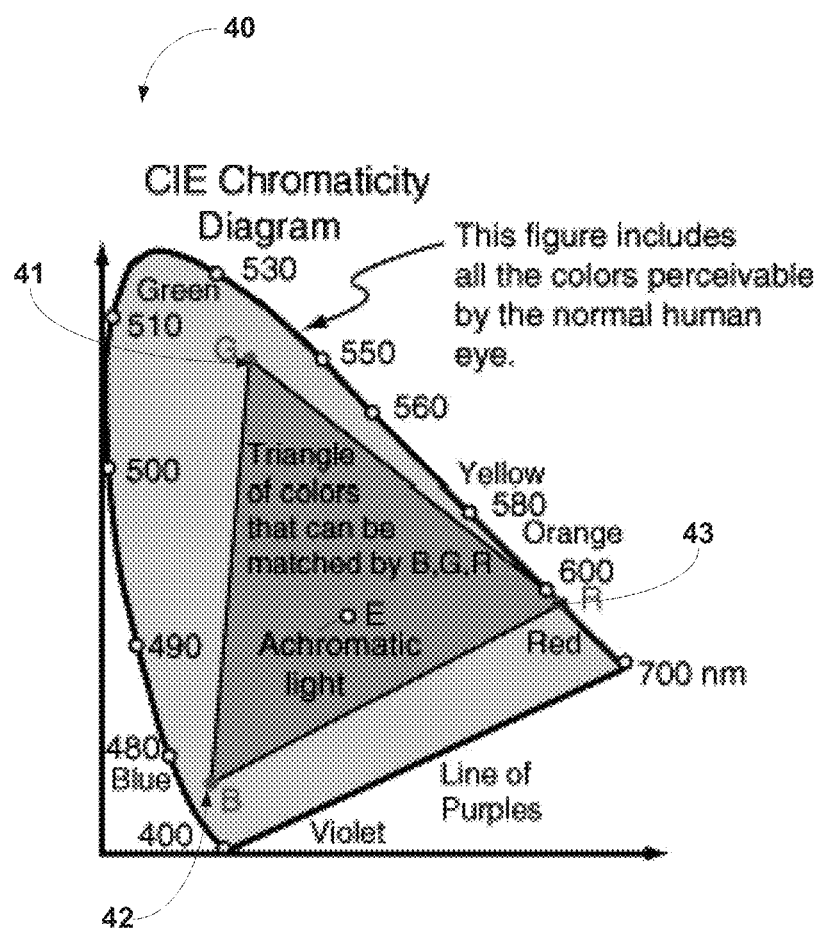
FIG. 5 is a depiction of the CIE color index with a triangle bounding the colors that are specified by the NTSC standard for television.

FIG. 8A also contains an additional embodiment depicted as 71. FIPEL panels have the ability to emit light of any color contained on the CIE color index chart shown in FIG. 5. The actual color emitted by FIPEL panel 74A is determined by the frequency of alternating current provided by signal generator 5 (FIG. 1). This means that the color of light emitted by FIPEL light bulb 70A can be changed at will by electronics control module 73. In this depiction, ambient light sensor 71A can sample the light in an environment such as a room and change the color of light emitted by FIPEL panel 74A to maintain a balanced light inside the room as light coming into the room through a window changes. In this embodiment, electronics control module may, on some periodic basis, turn off FIPEL panel 77A for some short period of time. The time period may be so short as to not register on the human eye. While FIPEL panel 74A is not emitting light, ambient light sensor 71A will sample the ambient light and electronics control module 73 will compute the color of light to be emitted by FIPEL panel 74A and will cause the frequency of the alternating current generated by signal generator 5 (FIG. 1) to change to a new value. The new frequency of the alternating current being sent to FIPEL panel 74A will cause FIPEL panel 74A to emit a different color of light. In another embodiment using an ambient light sensor, the control module is aware of the color of light being emitted by its FIPEL panel and can algorithmically determine the difference of the ambient light in the environment without turning off the FIPEL light.

Figure 8B:
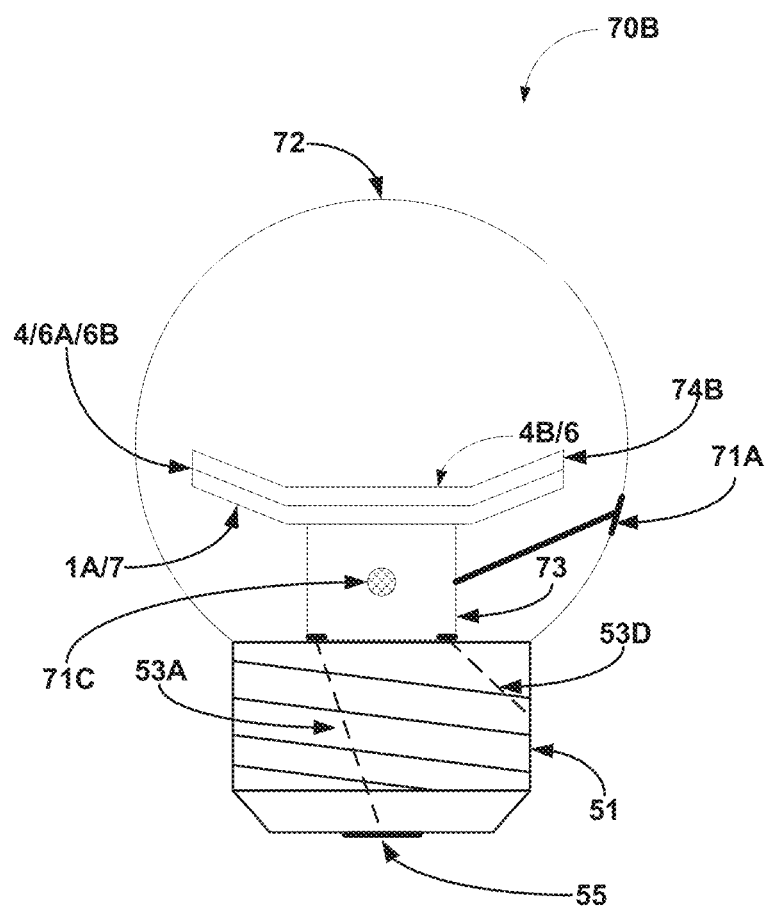
FIG. 8B is a depiction of a FIPEL light bulb with a stacked double layer FIPEL panel and a sensor to sense ambient light and an EMF sensor to sense signals initiated by a user to control the FIPEL panel.

Now referencing FIG. 8B where a FIPEL light bulb is depicted as 70B. This depiction is identical to the FIPEL light bulb shown in FIG. 8A with two very different additional embodiments. These are stacked FIPEL panel 74B and EMF sensor 71C. In this embodiment stacked FIPEL panel 74B provides a higher quantity of light than the single FIPEL 74A panel depicted in FIG. 8A. Stacked FIPEL panel 74B is shown and described in FIG. 12. The current FIPEL panel 74B emits light in a single direction toward the top of FIPEL light bulb 70B.

The current depiction also contains EMF sensor 71C which may be either a RF antenna or an IR sensor. In this depiction, a user may use a hand held remote, not shown, to send signals to FIPEL light bulb 70B to shift the color of light being emitted, the amount of light being emitted or to turn the light off or on. In a different embodiment, EMF sensor 71C may be a RF antenna and receive wireless signals from a RF emitter such as a WiFi network, not shown. The signals received may be originated by a computer connected to the WiFi network. These signals may cause FIPEL light bulb 70B to shift the color of light being emitted, the amount of light being emitted or to turn the light off or on.

Figure 9A:
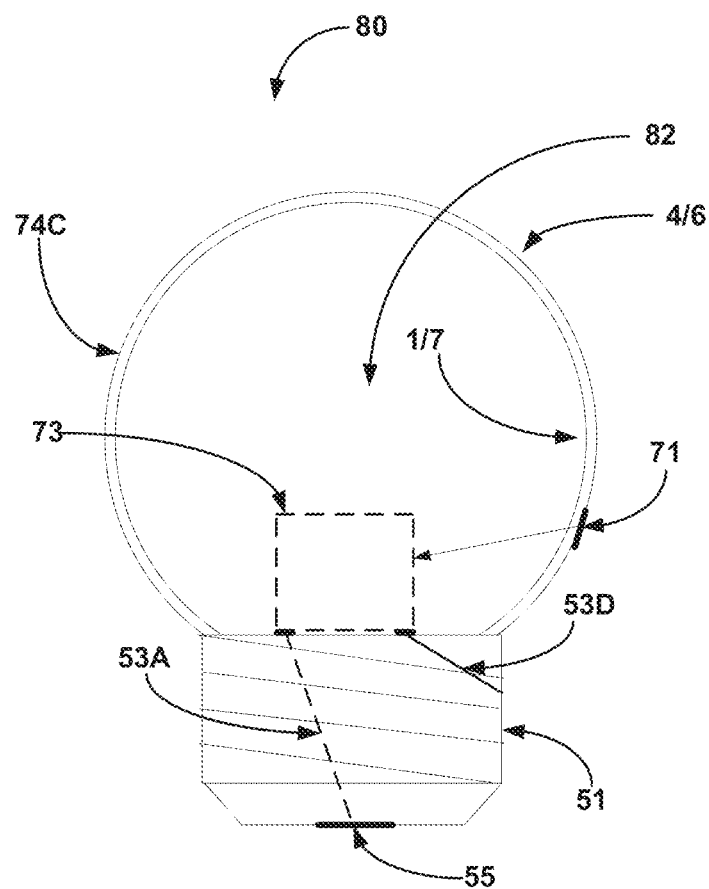
FIG. 9A is a depiction of a FIPEL light bulb where the shell of the light bulb is the FIPEL panel and has na ambient light sensor on the outer surface of the light bulb.

Now referencing FIG. 9A where FIPEL light bulb 80 is depicted. In this depiction FIPEL light bulb 80 more closely resembles a typical frosted incandescent light bulb. FIPEL panels may be constructed where the supporting substrates (see FIG. 1, substrates 4 and 1) may be formed from flexible materials such as but not limited to Polyethylene terephthalate (PET). Materials such as PET will allow the FIPEL panel to be molded into shapes other than flat panels. In the current depiction, FIPEL panel 74C forms light bulb shell 82. FIPEL panel 74C in this depiction is configured the same as the single layer FIPEL panel shown in FIG. 1. In the current depiction, electronics control module 73 is shown in dashed lines because FIPEL panel 74C is not transparent.

Figure 9B:
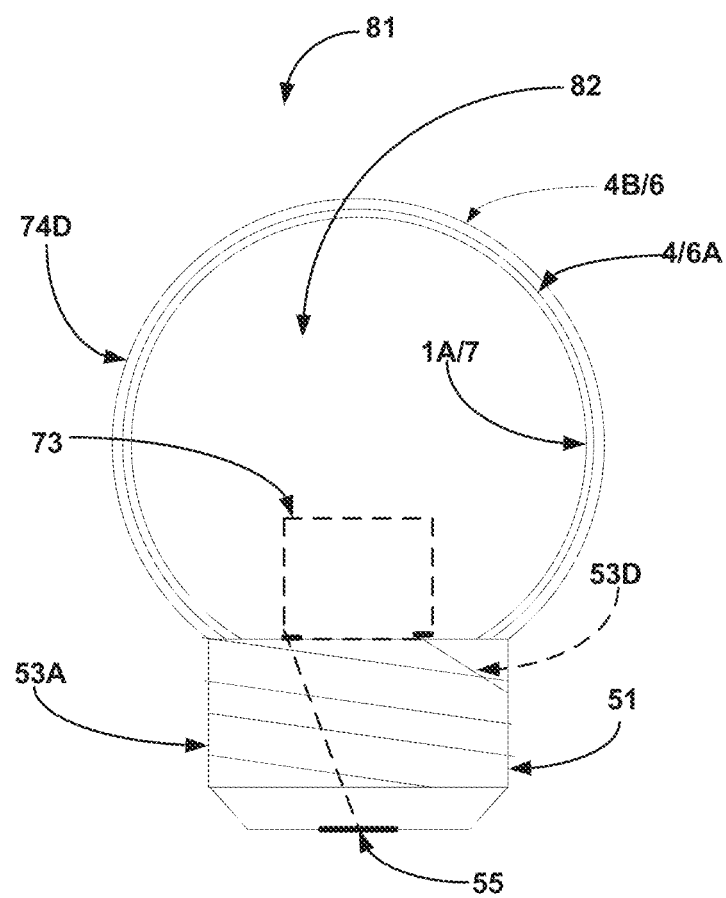
FIG. 9B is a depiction of a FIPEL light bulb where the shell of the light bulb is a stacked FIPEL panel.

Now referencing FIG. 9B where FIPEL light bulb 81 is depicted. In this depiction FIPEL light bulb 81 also resembles a typical frosted incandescent light bulb. In the current depiction, FIPEL panel 74C forms light bulb shell 82. FIPEL panel 74C in this depiction is configured the same as the stacked FIPEL panel shown in FIG. 12. In the current depiction, electronics control module 73 is shown in dashed lines because FIPEL panel 74C is not transparent.

Figure 10A:
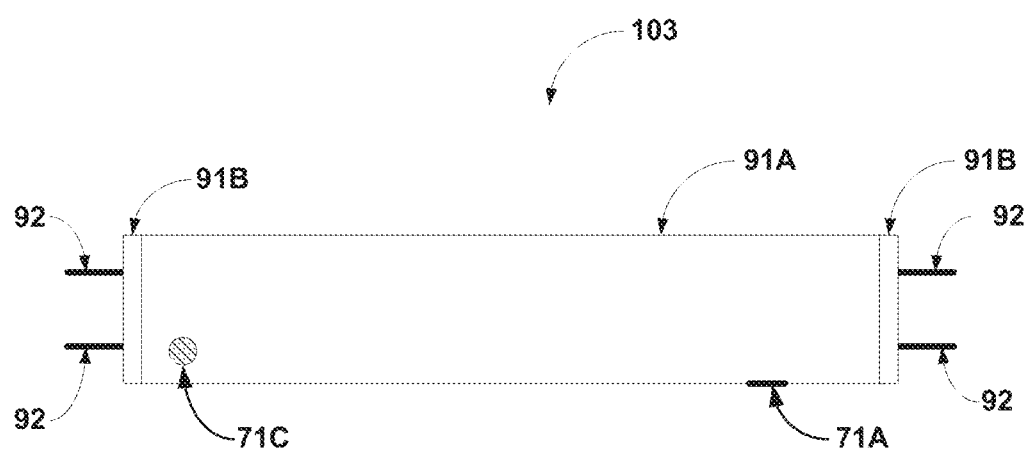
FIGS. 10A and 10B are schematic depictions of a FIPEL light tube with a built in control module for controlling brightness and color temperature intended to replace a fluorescent light tube.

Now referencing FIG. 10A where a FIPEL tube light is depicted. This type of FIPEL lighting device is meant to provide a replacement for existing fluorescent light tubes. In the current depiction, FIPEL light tube 103 contains FIPEL panel 91A, end caps 91B, support and conductor pins 92, ambient light sensor 71A and EMF sensor 71C. In this depiction, FIPEL panel 103 has been formed into a tube shape. Ambient light sensor 71A operates identically to ambient light sensor 71A as depicted in FIG. 8A and EMF sensor 71C operates identically to EMF sensor 71C as depicted in FIG. 8B.

Figure 10B:
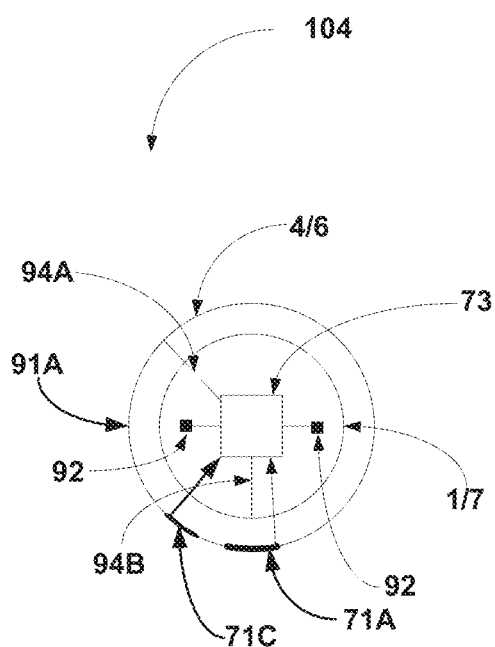

Now referencing FIG. 10B where FIPEL tube light depicted in FIG. 10A is shown as an end view with end cap 91B removed and depicted as 104. In the current depiction, FIPEL panel 91A is a single FIPEL panel, In this depiction, alternating current is provided to electronics control module 73 through support and conductor pins 92. Electronics control module 73 operates identically to electronics control module 73 described in FIG. 8A. Alternating current from signal generator 5 (shown in FIG. 1) is delivered to FIPEL panel 91A through conductors 94A and 94B. In this depiction ambient light sensor 71A is connected to electronics control module 71A and operates identically to the ambient light sensor 73 as described in FIG. 8B. EMF sensor 71C is connected to electronics control module 73 and operates identically to EMF sensor described in FIG. 8B. Note that in this depiction, light is emitted evenly around the surface of FIPEL panel 91A.

Figure 11A:
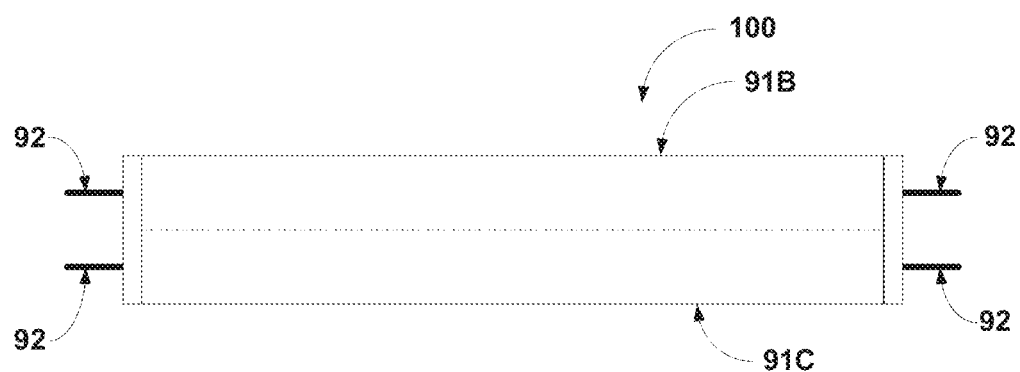
FIGS. 11A and 11B are schematic depictions of a stacked FIPEL light tube with a built in control module for controlling brightness and color temperature with an ambient light sensor and a EMF sensor.

Now referencing FIG. 11A where 100 depicts FIPEL light tube with two portions. FIPEL light tube upper portion 91B and FIPEL light tube lower portion 91C both of which are stacked FIPEL panels depicted in FIGS. 12 and 13. In this current depiction, FIPEL light tube upper portion 91B is configured the same as FIPEL stack shown in FIG. 12. FIPEL light tube lower portion 91C is configured the same as FIPEL stack shown in FIG. 13. In the current depiction light is not emitted from the top surface of FIPEL light tube 100.

Figure 11B:
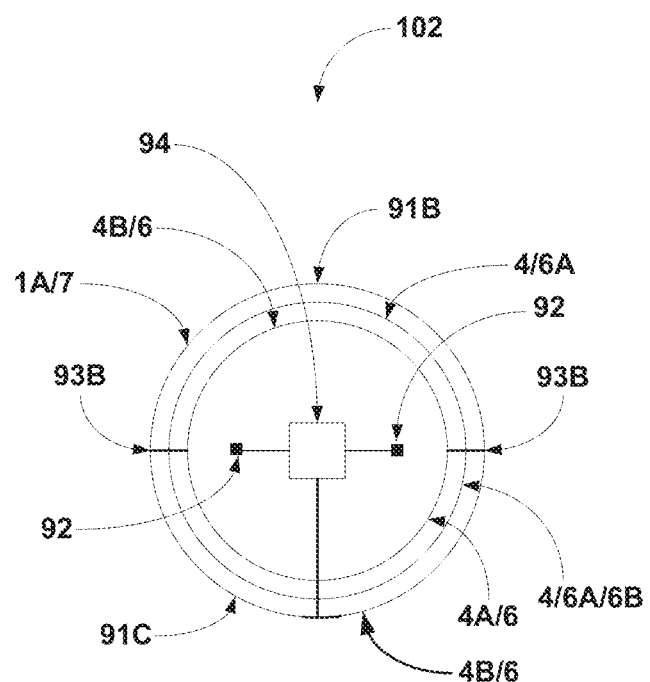

Now referencing FIG. 11B where a FIPEL tube light is depicted as FIPEL tube light end view 102. In this depiction, 93B shows the dividing line between FIPEL light tube upper portion 91B and FIPEL light tube lower portion 91C. Note that both the upper portion 91B and lower portion 91C are stacked FIPEL panels as described in FIG. 12 and FIG. 13. Light emitted by FIPEL light tube upper portion 91B travels downward toward the interior of the light tube. FIPEL light tube upper portion 91B has a reflective back surface 1A/7 which reflects any light emitted toward the back surface by both emissive layers of the stacked FIPEL panels 111A and 112A shown in FIG. 12. Light emitted by FIPEL light tube lower portion 91C emits light in two directions, those being into the interior of the light tube and out the bottom surface of FIPEL light tube lower portion 91C. Any light emitted by the lower portion into the interior of the light tube travels through the stacked FIPEL light tube upper portion 91B and reflected back into the interior of the light tube and out the transparent stacked FIPEL light tube lower portion 91C. Most fluorescent light tubes are mounted into a fixture where light emitted from the upper surface of the light tube is reflected by a white background. The methodology used by the stacked FIPEL light tube as shown in FIGS. 11A and 11B is more efficient because all of the light emitted by the FIPEL light tube upper portion 91B is directed and redirected downward through the FIPEL light tube lower portion 91C and not scattered by an upper exterior reflector.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art. For example, the techniques described herein can be used with other shapes of light bulbs.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, displayport, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A lighting device, comprising
   a housing, having an element emitting light;
   an electrical connection;
   a signal generator, driven by electricity on said electrical connection to output a signal having a frequency;
   a light emitting layer that receives the signal from the signal generator, and outputs light of a wavelength that is dependent on said frequency emitted by said signal generator; and
   a sensor module that senses ambient light adjacent said housing, and adjusts said signal generator based on said ambient light that is sensed.

2. The lighting device as in claim 1, wherein said sensor module senses a color temperature of the ambient light, and adjusts a color temperature emitted by the light emitting layer by changing the frequency emitted by said signal generator.

3. The lighting device as in claim 1, wherein said sensor module senses an amount of ambient light, and adjusts an intensity of the light that is emitted from said light emitting layer.

4. The light emitting device as in claim 1, wherein said light emitting layer includes a layer of material that emits light from both surfaces, and a first reflector on a first side reflecting light from the first surface back towards an emitting surface.

5. The light emitting device as in claim 1, wherein a color of the emitted light is any point on a CIE index, selected by selecting a frequency of the signal generator.

6. The lighting device as in claim 1, wherein the light emitting layer is turned off at specified intervals, and said sensor module senses the ambient light during the specified intervals during which the light emitting layer is turned off and not emitting light.

7. The lighting device as in claim 6, wherein said specified intervals are times less than a persistence of vision.

8. The lighting device as in claim 1, wherein the sensor module operates while the light emitting layer is emitting light, and further comprising a processing element that uses known characteristics of the light being emitted by the light emitting layer to said known characteristics from light being sense by the sensor module, to compensate light received by the sensor module for the light emitted by the light emitting layer.

9. The light emitting device as in claim 8, wherein said processing element uses said known characteristics that include intensity and color temperature of light being emitted by the light emitting layer.

10. The light emitting device as in claim 1, further comprising a control that allows a user to vary a color of the emitted light.

11. The light emitting device as in claim 10, wherein said control is a remote control command received over a wireless link.

12. The lighting device as in claim 1, wherein said light emitting substance is along a curved surface forming an outer surface of the housing.

13. The light emitting device as in claim 12, wherein said housing is round in cross-section, and said light emitting substance is coated on said round in cross section housing.

14. The lighting device as in claim 13, wherein said light emitting layer is formed of a first light emitting layer formed between two electrodes that are excited by said signal generator, and at least one second light emitting layer, stacked to and attached to said first light emitting layer, said second light emitting layer which emits light separately from said first light emitting layer.

15. The light emitting device as in claim 1, wherein said light emitting layer includes multiple stacked layers of material.

16. The lighting device as in claim 15, wherein said multiple layers of material include a transparent electrically conducting surface, another electrically conducting surface, and multiple layers of material between said transparent electrically conducting surface and said another electrically conducting surface, where said multiple layers of material output light when excited by the output of the signal generator.

17. The lighting device as in claim 15, wherein said light emitting layer is formed of a first light emitting layer formed between two electrodes that are excited by said signal generator, and at least one second light emitting layer, stacked to and attached to said first light emitting layer, said second light emitting layer which emits light separately from said first light emitting layer.

18. The lighting device as in claim 17, further comprising a second signal generator producing an output that drives said second light emitting layer.

19. The lighting device as in claim 17, wherein said first and second light emitting layer share and are bonded to a common electrode that is between said first and second light emitting layers.

20. A method of lighting, comprising
exciting a light emitting layer with a signal from a variable signal generator, said light emitting layer excited to outputs light of a wavelength that is dependent on a frequency emitted by said signal generator;
sensing ambient light adjacent a housing that holds the light emitting layer; and
adjusting said signal generator based on said ambient light that is sensed to change the light that is emitted.

21. The method as in claim 20, wherein said sensing senses a color temperature of the ambient light, and adjusts a color temperature emitted by the light emitting layer by changing the frequency emitted by said signal generator.

22. The method as in claim 20, wherein said sensing senses an amount of ambient light, and adjusts an intensity of the light that is emitted from said light emitting layer.

23. The method as in claim 20, wherein a color of the emitted light is any point on a CIE index, selected by selecting a frequency of the signal generator.

24. The method as in claim 20, wherein said sensing comprises turning off the light emitting layer is turned off at specified intervals, and sensing the ambient light during the specified intervals during which the light emitting layer is turned off and not emitting light.

25. The method as in claim 24, wherein said specified intervals are times less than a persistence of vision.

26. The method as in claim 20, wherein the sensing operates while the light emitting layer is emitting light, and further comprising using known characteristics of the light being emitted by the light emitting layer with said known characteristics from light being sensed, to compensate light received by the sensing for the light emitted.

27. The method of claim 26, wherein said known characteristics include intensity and color temperature of light being emitted by the light emitting layer.

28. The method as in claim 20, further comprising allowing a user to vary a color of the emitted light by a control.

29. The method as in claim 28, wherein said control further comprising a remote control command received over a wireless link.

* * * * *